United States Patent
Park et al.

(10) Patent No.: US 7,711,262 B2
(45) Date of Patent: May 4, 2010

(54) METHOD OF PHOTOGRAPHING PANORAMIC IMAGE

(75) Inventors: Kyoung-Ju Park, Seoul (KR); Sung-Dae Cho, Yongin-si (KR); Young-Min Jeong, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 370 days.

(21) Appl. No.: 11/789,159

(22) Filed: Apr. 24, 2007

(65) Prior Publication Data

US 2007/0253698 A1 Nov. 1, 2007

(30) Foreign Application Priority Data

Apr. 25, 2006 (KR) .................. 10-2006-0037156

(51) Int. Cl.
G03B 17/20 (2006.01)
G03B 41/00 (2006.01)
H04N 7/00 (2006.01)
(52) U.S. Cl. .................. 396/296; 396/322; 348/39
(58) Field of Classification Search .................. 396/60, 396/72, 85, 379, 296, 322; 348/36, 39, 240.99, 348/240.1, 240.2, 240.3, 347
See application file for complete search history.

(56) References Cited

U.S. PATENT DOCUMENTS

2004/0189849 A1 9/2004 Hofer

2005/0168594 A1* 8/2005 Larson .................. 348/222.1
2005/0264650 A1* 12/2005 Park et al. .................. 348/36

FOREIGN PATENT DOCUMENTS

| JP | 2006-20111 | 1/2006 |
|---|---|---|
| KR | 2002-83261 | 11/2002 |
| KR | 2003-52444 | 7/2003 |
| KR | 2006-6186 | 1/2006 |

\* cited by examiner

Primary Examiner—Rochelle-Ann J Blackman
(74) Attorney, Agent, or Firm—Cha & Reiter, LLC

(57) ABSTRACT

Disclosed is a method of photographing a panoramic image, the method including the steps of: checking if a configuration of each scene constituting the panoramic image is arbitrarily set whenever each scene is photographed; outputting a photographic guide screen on a preview screen, the photographic guide screen overlappingly displaying a guide image of a previously photographed scene and displaying an indicator indicative of a position of a current scene; storing a corresponding photographed scene as a correspondingly numbered scene when a shutter key is input during the outputting of the photographic guide screen; and checking if a predetermined direction key or a completion key is input, determining that all scenes are photographed, when the completion key is input, and considering the frame to extend in an up-and-down direction or a right-and-left direction and proceeding to the step of outputting the photographic guide screen, when the direction key is input.

15 Claims, 11 Drawing Sheets

METHOD OF PHOTOGRAPHING PANORAMIC IMAGE

CLAIM OF PRIORITY

This application claims the benefit under 35 U.S.C. §119 (a) of an application entitled "Method of Photographing Panoramic Image," filed in the Korean Intellectual Property Office on Apr. 25, 2006 and assigned Serial No. 2006-037156, the contents of which are hereby incorporated by reference.

BACKGROUND OF THE INVENTION

1. Field of the Invention

The present invention relates to digital image photography and various other devices having a digital imaging function, such as a mobile communication terminal, and more particularly to a method of photographing a panoramic image.

2. Description of the Related Art

In general, a photographing unit of a digital imaging apparatus can capture an image ranging between 30 to 50 degree, which is less than the eye sight of a human that ranges between 150 to 200 degree. A panoramic photographing scheme refers to a technique for producing an image similar to or greater than the viewing field of human eyes, by photographing several scenes while changing only the photographing angle at an increment, and sequentially connecting the photographed scenes in order to reconstruct the scenes into a single image.

In a panoramic photographing mode, a digital imaging apparatus generally photographs several scenes in such a manner as to follow one after another in a transverse or longitudinal direction, then stores the photographed images in a memory. Subsequently, the images stored in the memory are provided to an internal/external image processor unit to reproduce into a single image. In order to remove color differences and image distortions appearing in the boundary portions of the scenes, multiple scenes are photographed in such a manner so that their boundary portions appropriately overlap. Thereafter, the image processing operations including aligning, stitching, and blending are conducted so that overlapping portions of the photographed images can harmonize with each other. As a result, a single image, in which several scenes are naturally connected, is produced.

An important thing to be considered in the panoramic photographing is to photograph respective scenes in such a manner as to be aligned as exactly as possible. To this end, in addition to a basic scheme in which a user manually photographs scenes using an accessory device, such as a tripod, a new scheme has recently been proposed, in which a photographing apparatus is mounted on a rotating mechanism attached to a tripod, etc., and the mounted photographing apparatus rotates corresponding to respective scenes to be photographed during the panoramic photographing. An example of such technology is disclosed in Korean Patent Application No. 2003-0052444 (title: CAMERA AND METHOD FOR PHOTOGRAPHING PANORAMA PICTURES, Applicant: SAMSUNG TECHWIN CO., LTD, Inventor: Sungcheol BAE, Date of Application: 2003. Jul. 29).

In order to exactly align the respective scenes without the aid of the above-mentioned accessory devices in the panoramic photographing, another scheme has been proposed, in which the edge portion of a previously photographed image is displayed in such a manner as to appropriately overlap with an image to be currently photographed, so that a user can adjust a proper photographing position by matching the current image to the previous image. An example of such technology us disclosed in U.S. Published Application No. 2004/0189849 (title: PANORAMIC SEQUENCE GUIDE, Inventor: Gregory V. Hofer, Date of Application: 2003. Mar. 31).

As the panoramic photographing operation is more complex than a normal photographing and also requires a skilled user, there is a need for a new technique to provide a user with a more convenient and efficient photographing operation.

SUMMARY OF THE INVENTION

Accordingly, the present invention has been made to solve the above-mentioned problems occurring in the prior art and provides additional advantages, by providing a method of photographing a panoramic image, which enables a user to more easily handle a photographing operation and be provided with more autonomy in the structure of each scene constituting a panoramic image.

In accordance with an aspect of the present invention, there is provided a method of photographing a panoramic image which includes: a first step of checking whether a configuration of each scene constituting the panoramic image is set according to a predetermined frame or arbitrarily set whenever each scene is photographed; a second step of outputting a photographic guide screen on a preview screen when a result of the checking in the first step shows that the configuration of each scene is arbitrarily set whenever each scene is photographed, the photographic guide screen overlappingly displaying a guide image of a previously photographed scene and displaying an indicator indicative of a position, which a scene to be currently photographed assumes in a whole frame, by using scenes having been photographed so far; a third step of storing a corresponding photographed scene as a correspondingly numbered scene when a shutter key is input during the outputting of the photographic guide screen in the second step; and a fourth step of checking if a predetermined direction key or a completion key is activated after the third step is conducted, determining that all scenes are completely photographed when the completion key is input, and considering the frame to extend from the currently photographed scene along an up-and-down direction or a right-and-left direction corresponding to the input direction key, and proceeding to the second step of outputting the photographic guide screen when the direction key is input.

In accordance with another aspect of the present invention, the method further including: a fifth step of outputting a photographic guide screen on a preview screen when a result of the checking in the first step shows that the configuration of each scene is set according to the predetermined frame, the photographic guide screen overlappingly displaying a guide image of a previously photographed scene and displaying an indicator indicative of a position, which a scene to be currently photographed assumes in the predetermined frame, by using scenes having been photographed so far; a sixth step of storing a corresponding photographed scene as a correspondingly numbered scene when the shutter key is input during the outputting of the photographic guide screen in the fifth step; and a seventh step of checking if the currently photographed scene is a last scene in the predetermined frame after the sixth step is conducted, determining that all scenes are completely photographed when the currently photographed scene is the last scene, and proceeding to the fifth step of outputting the photographic guide screen when all the scenes are not completely photographed.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Figure 1:
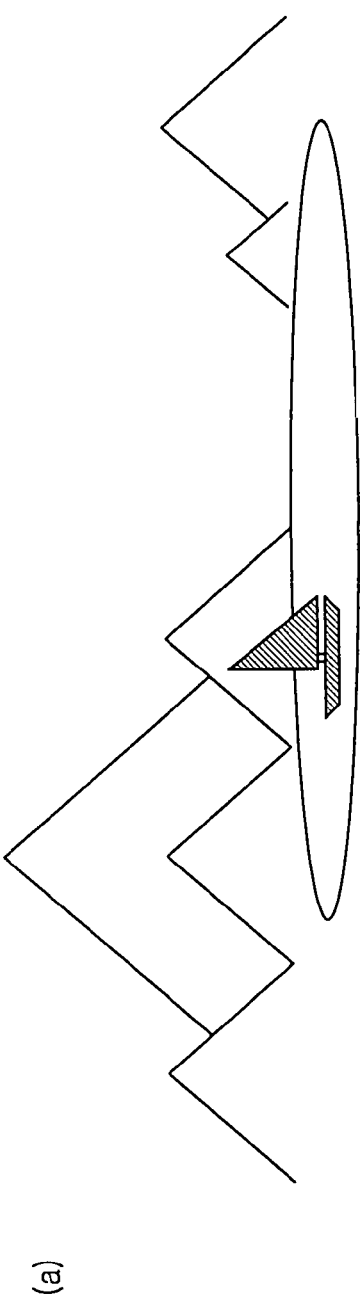
FIG. 1 is a view illustrating an object to be panoramically photographed and a photographing screen thereof.
Figure 1:
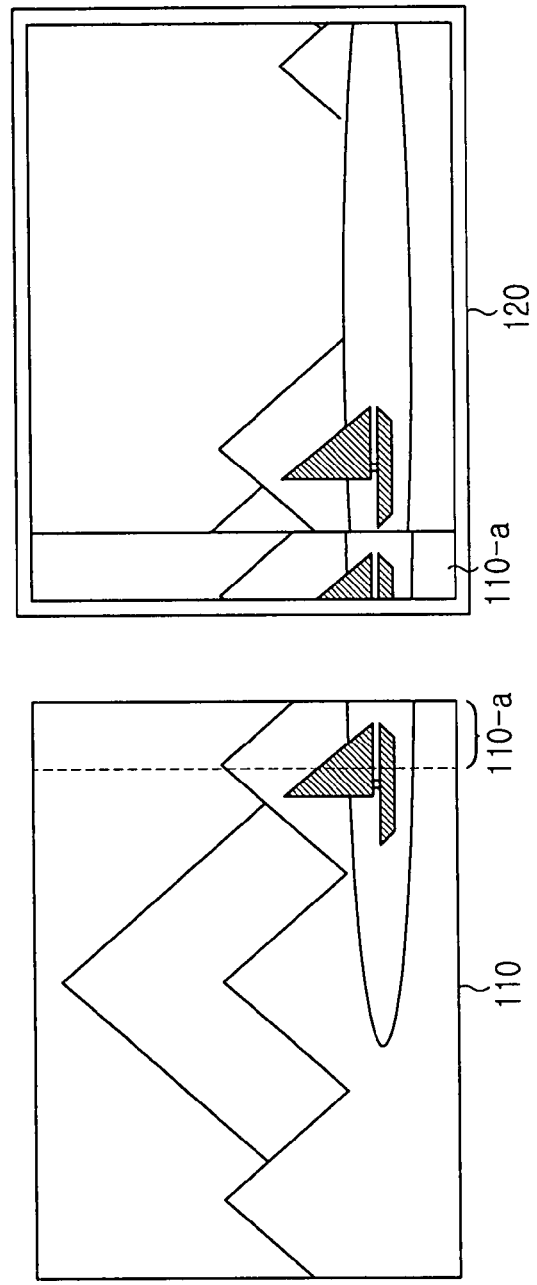

Hereinafter, exemplary embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. For the purposes of clarity and simplicity, a detailed description of known functions and configurations incorporated herein will be omitted as it may make the subject matter of the present invention rather unclear.

FIG. 1 illustrates a panoramic scene to be captures using an image capturing device. In particular, a natural landscape is illustrated in FIG. 1(a), and FIG. 1(b) shows the respective photographing screens during panoramic photographing of the corresponding scene. As an example, one of the photographing screens 110, 120 illustrated in (b) of FIG. 1 may be a screen 110 displaying a first scene having been already photographed and stored, and the other may be a preview screen 120 displaying a second scene to be currently photographed. As seen from (b) of FIG. 1, a part of the stored first scene, which is continuous to the second scene, is displayed as a guide image 110-a on one side of the preview screen 120 where the second scene is connected with the first scene. Thus, a user can properly adjust a photographing position of the second scene displayed on the preview screen 120 by referencing to the guide image 110-a.

Figure 2A:
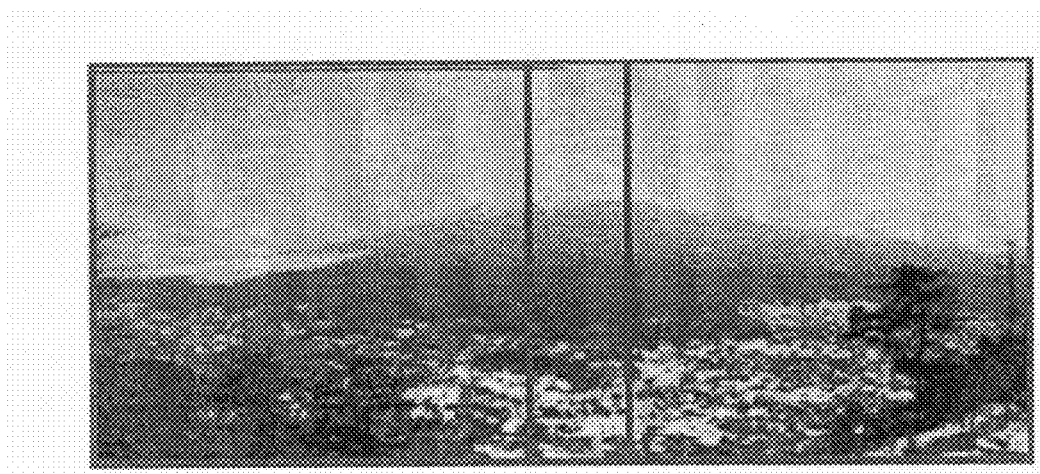
FIGS. 2a and 2b are views, each illustrating a panoramic image in which two scenes overlap.
Figure 2B:
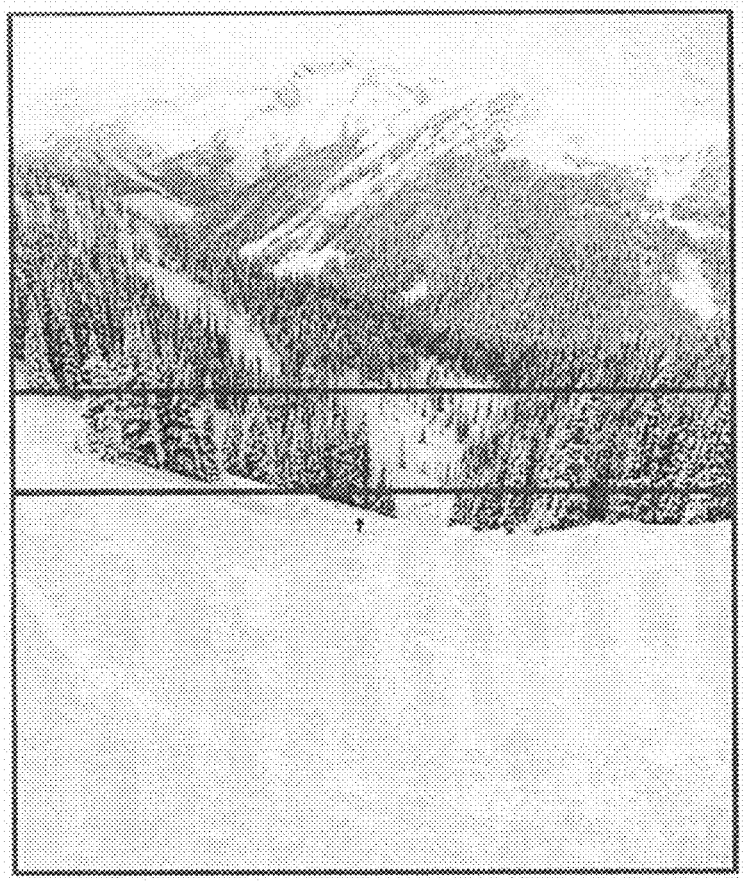

FIGS. 2a and 2b illustrate a panoramic image in which two scenes overlap, respectively. In particular, FIG. 2a presents a panoramic image in which two photographed scene are connected in a transverse direction, and FIG. 2b presents a panoramic image in which two photographed scenes are connected in a longitudinal direction. In this way, when a panoramic image is photographed, a plurality of scenes constituting the panoramic image may be configured in such a manner as to be arranged in line in a transverse or longitudinal direction. In panoramic photographing, it is common that the number of scenes constituting one panoramic image is fixedly predetermined.

Since the number of scenes constituting a panoramic image is predetermined and the scenes are simply arranged in line in a transverse or longitudinal direction, as mentioned just before, it is difficult for a user to photograph a subject in a desired manner. Accordingly, the teachings of the present invention enable a user to autonomously set the number and the spatial structure of scenes constituting a panoramic image, as explained herein after.

Figure 3:
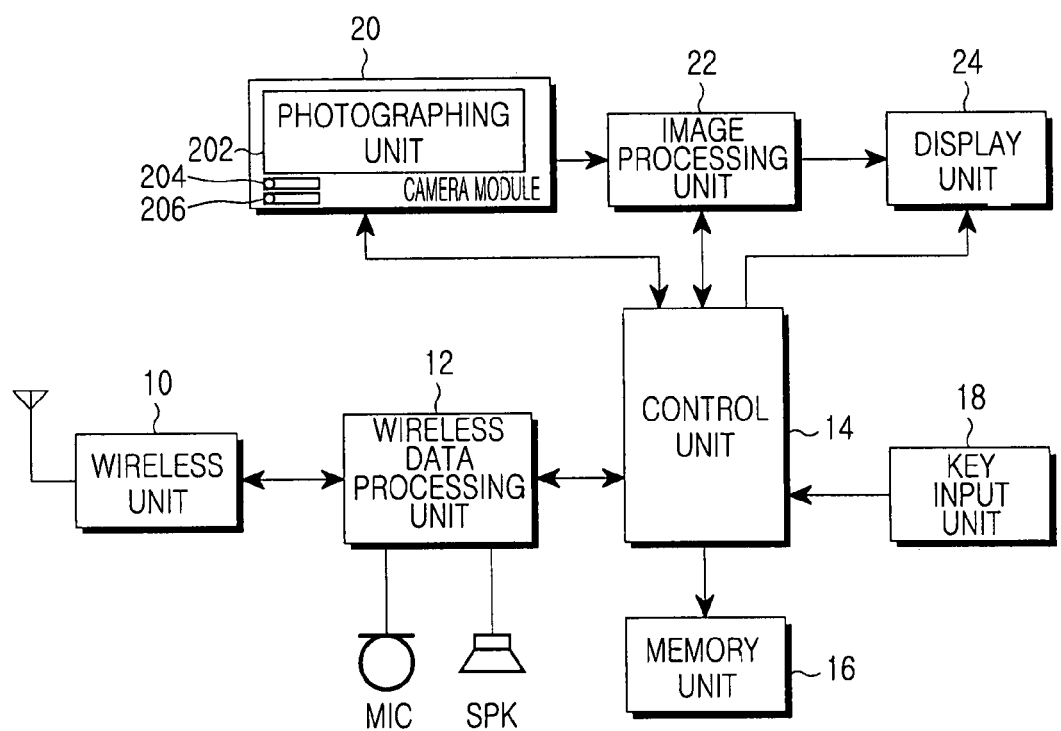
FIG. 3 is a constructional block diagram of a portable terminal to which the present invention is applied.

FIG. 3 illustrates the construction of a portable terminal to which the present invention is applied. As shown, a basic hardware device of a portable terminal is illustrated, but it should be noted that inventive techniques can be applicable to other devices capable of photographing an image or have a digital imaging function. The present invention may be more effective when applied to a device attaching importance to portability and having a small angle of view, such as a portable terminal, rather than a common digital camera.

Referring to FIG. 3, the portable terminal having a digital imaging function according to the embodiment of the present invention may include a camera module 20, an image processing unit 22, a display unit 24, a controller unit 14, a memory unit 16, a key input unit 18, a wireless unit 10, and a wireless data processing unit 12.

The wireless unit 10 modulates a user's voice, a text, and control data into a wireless signal and transmits the modulated wireless signal to a base station (not shown) in a mobile communication network. The wireless unit 10 receives a wireless signal from a base station and demodulates the received wireless signal into a voice, a text, control data, etc. The wireless data processing unit 12 is operative to decode voice data received by the wireless unit 10 and output the decoded voice data into an audible voice through a speaker, operative to process a user's voice signal, input from a microphone, into data and output the processed data to the wireless unit 10, and operative to provide a text and control data, input through the wireless unit 10, to the controller unit 14. These all operations of the wireless data processing unit 12 are performed under the control of the controller unit 14.

The camera module 20 performs a general digital camera function of photographing visible light input from an external subject under the control of the controller unit 14. Such a camera module 20 has a photographing unit 202 consisting of a CCD image sensor and so forth, and may also have an illumination sensor for providing an illuminance measurement, a distance sensor for measuring a focal length between a lens and a subject, etc. The image processing unit 22 processes image data output from the camera module 20 to thereby convert it into digital image data of a suitable format.

The key input unit 18 is a unit for inputting a phone number or a text through a user's key operation. This key input unit 18 has keys for inputting figure and character information, and function keys for setting various functions. Further, the key input unit 18 outputs key input signals to the controller unit

14. The display unit 24 may be formed by any type of display device such as a Liquid Crystal Display (LCD) or the like, and displays messages for various operational states of the portable terminal as well as photographed digital image data.

The controller unit 14 generally controls overall operations of the above-mentioned functional units of the portable terminal. That is, the controller unit 14 performs processing according to number and menu selection signal inputs through the key input unit 18, performs processing according to an external photographing signal input through the camera module 20, and outputs photographed images as well as image output signals required for various operations through the display unit 24. If necessary, the controller unit 14 fetches target output contents stored in the memory unit 16 or stores corresponding contents in the memory unit 16. The memory unit 16 stores a plurality of programs and data related to the operations of the controller unit 14, and is used for storing information necessary for the use of the portable terminal and photographed image information.

Note that above portable terminal performs operations regarding mobile communication services as well as a camera function. In performing the camera function, the controller unit 14 performs a panoramic photographing operation in addition to the above-mentioned control operations. Further, the memory unit 16 stores operational programs for the panoramic photographing operation and information related thereto, and outputs corresponding information to the controller unit 16, if necessary.

Figure 4:
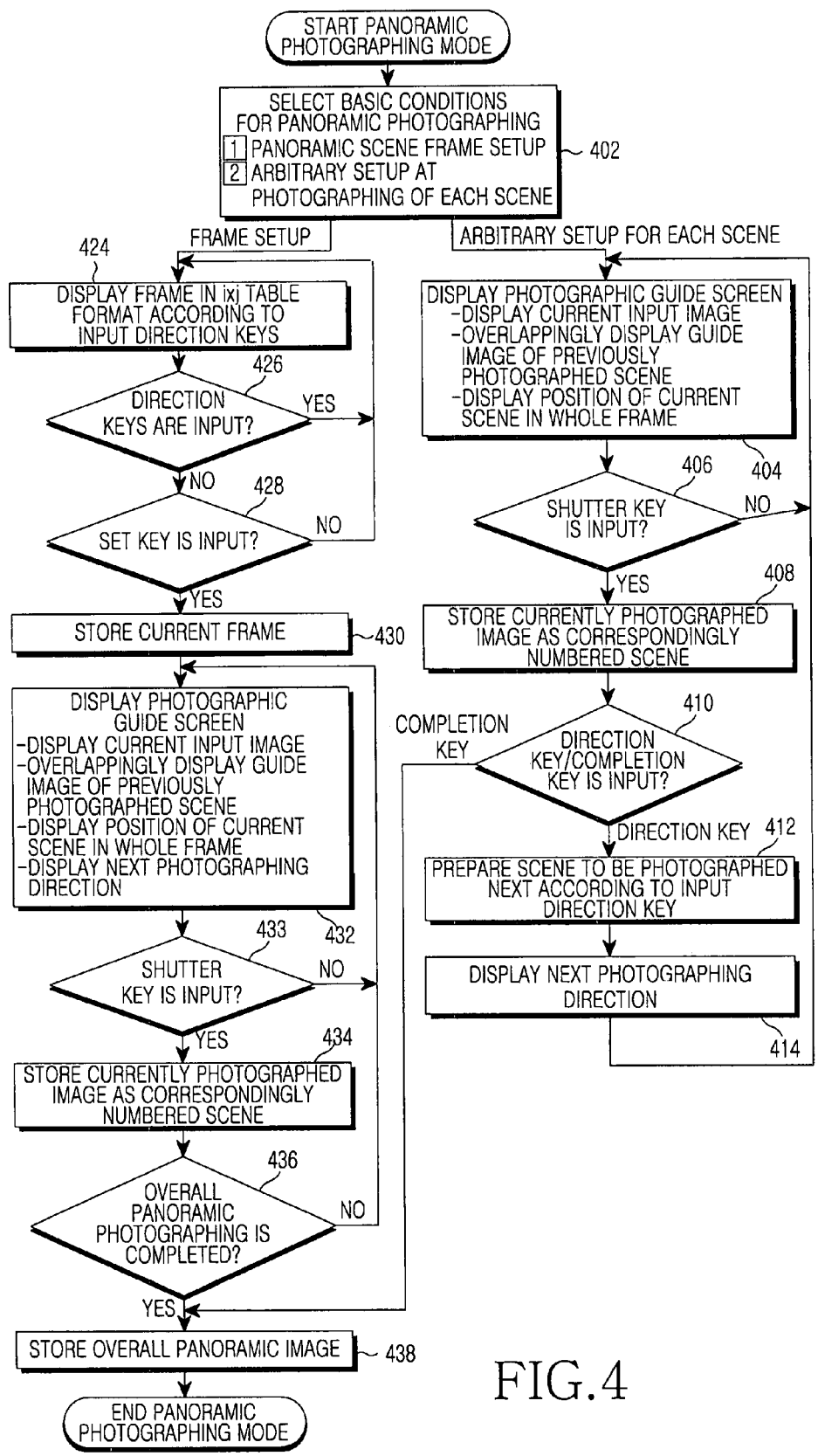
FIG. 4 is a flowchart illustrating a panoramic photographing operation according to an exemplary embodiment of the present invention.

FIG. 4 is a flowchart illustrating a panoramic photographing operation according to an exemplary embodiment of the present invention. The portable terminal may be configured in such a manner that the panoramic photographing operation as illustrated in FIG. 4 is performed when a user selects a camera photographing menu from among menu items for setting various functions of the portable terminal and then selects a "panoramic photographing mode" from among lower menus of the camera photographing menu. In order to support such a menu selection operation, the portable terminal is provided in advance with an architecture and an operational program for displaying a corresponding menu item and confirming a user's key input via the key input unit.

Referring to FIG. 4, the panoramic photographing mode operation begins with step 402, in which a user selects basic panoramic photographing conditions in order to set the configuration condition of each scene constituting a panoramic image. That is, for example, the so-called "panoramic scene frame setup" item and the so-called "arbitrary setup for each photographic scene" item are appropriately displayed, and the user can select one of them by inputting the corresponding item via the key input unit. When the "panoramic scene frame setup" item is selected, the configuration of each scene is set in advance and then a panoramic image is photographed. On the contrary, when the "arbitrary setting for each photographic scene" item is selected, the configuration of each scene is arbitrary set whenever each scene is photographed. The panoramic photographing operation proceeds to step 424 if the user selects the "panoramic scene frame setup" item, and proceeds to step 404 if the user selects the "arbitrary setup for each photographic scene" item.

Figure 8:
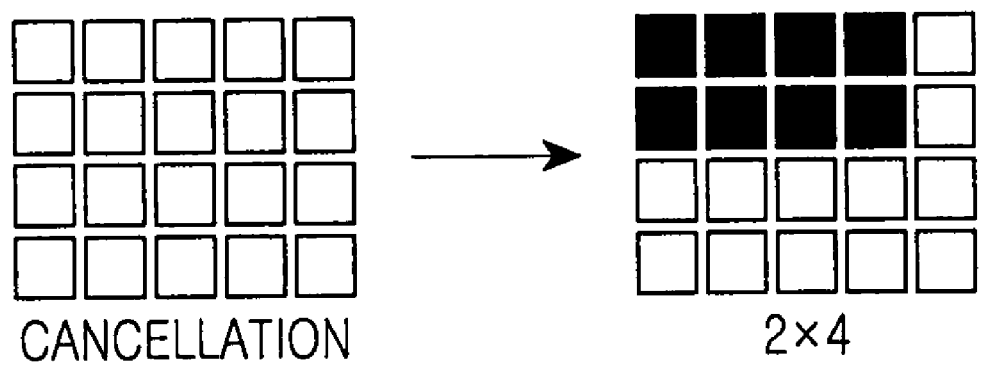
FIG. 8 is a view illustrating a menu screen for setting up a panoramic scene frame when a panoramic image is photographed according to an exemplary embodiment of the present invention.

In step 424, a menu screen for scene frame setup, which is provided in an i×j table format preset according to input direction keys, is displayed on the display unit of the portable terminal. FIG. 8 illustrates a menu screen for setting up a panoramic scene frame when a panoramic image is photographed according to an exemplary embodiment of the present invention. As illustrated in FIG. 8, the menu screen for scene frame setup may be provided in the 4×5 table format. In this case, the user can adjust the frame in a desired form by inputting up-and-down and right-and-left direction keys (so-called navigation keys) several times.

That is, when the menu screen for scene frame setup is displayed, an i×j table is initially (i.e., before the navigation keys are not input) displayed in a state where each cell is not yet filled with a special substance (color, oblique line, icon, character, etc.). If the navigation keys are input in such a state, this key input is confirmed in step 426, and corresponding cells of the i×j table are filled with a preset substance according to the input of the navigation keys. In right side of FIG. 8, the scene frame is adjusted to 2×4 according to the user's setting. In such a state, if the user inputs the "SET" key provided in the key input unit, this key input is confirmed in step 428, and the panoramic photographing operation proceeds to step 430, in which the adjusted frame is stored.

Subsequently, in step 432, a photographic guide screen according to the present invention is displayed on a preview screen, and the user starts to photograph each scene constituting the panoramic image. In photographing each scene, an image currently input through the camera lens is basically displayed first, then the guide image of a previously photographed scene is overlappingly displayed. Of course, since there is no previously photographed scene when the first scene is photographed, a guide image is not overlappingly displayed. The position which the current scene assumes in the whole setup frame is further displayed by means of a proper indicator. If necessary, the next photographing direction may also displayed by means of a proper indicator.

If the shutter key is input when the photographic guide image is displayed in step 432, this key input is confirmed in step 433, and the panoramic photographing operation proceeds to step 434. In step 434, a corresponding photographed scene is stored as a correspondingly numbered scene in the internal memory unit. Subsequently, whether to photograph all scenes constituting the panoramic image is determined in step 436 by checking that the currently photographed scene is the last scene of panoramic image scenes according to whole set-up frame. If a result of the checking in step 436 shows that the panoramic photographing is not completed, the panoramic photographing operation proceeds to step 432, and the above-mentioned steps are repeatedly performed. On the contrary, if the panoramic photographing is completed, the panoramic photographing operation proceeds to step 438.

In step 438, the respective photographed panoramic image scenes are connected into one panoramic image, and the panoramic image is stored in the memory unit. In this step, the respective scenes are subjected to image processing operations, such as aligning, stitching and blending, so that overlapping portions of them harmonize with each other. Afterwards, the panoramic image stored in this way may be sent to other portable terminals through an MMS (Multimedia Messaging System) or via an e-mail, and transmitted to a PC so as to be utilized by the user.

Meanwhile, in step 404 to which the panoramic photographing operation proceeds when the user selects the "arbitrary setup for each photographic scene" item in step 402, the user immediately starts to photograph each scene. First, similar to step 432, a photographic guide image according to the present invention is displayed in a preview screen in step 404, and the user starts to photograph each scene constituting the panoramic image. In this case, an image currently input through the camera lens is basically displayed on the preview screen, and the guide image of a previously photographed scene is overlappingly displayed. The position which the current scene assumes in the whole frame is further displayed by means of a proper indicator. However, since the whole frame is not set in advance when the "arbitrary setup for each photographic scene" item is selected, the whole frame is formed by only the scenes photographed so far, and the position of the current scene is displayed in the so-formed whole frame by means of a proper indicator. Further, since the user is not aware of the direction of the next scene, the next photographing direction may not be displayed.

If the shutter key is input when the photographic guide image is displayed in step 404, this key input is confirmed in step 406, and the panoramic photographing operation proceeds to step 408. In step 408, a corresponding photographed scene is stored as a correspondingly numbered scene in the internal memory unit. Subsequently, whether to input the navigation key or the completion key (this is an appropriately set function key for operating a corresponding function, and may be the same as the "SET" key in step 428) is checked in step 410. If the completion key is input, the panoramic photographing is considered to be completed, and the panoramic photographing operation proceeds to step 438, in which the corresponding panoramic image is stored. On the contrary, if the navigation key is input, the panoramic photographing operation proceeds to step 412.

In step 412, the scene frame is considered to extend from the currently photographed scene along an up-and-down direction or a right-and-left direction corresponding to the input navigation key, and the next scene to be photographed is prepared. Subsequently, in step 414, the next photographing direction according to the navigation key input is displayed in the currently photographed scene, then the panoramic photographing operation proceeds to step 404, in which the above-mentioned steps are repeatedly performed in order to photograph the next scene.

Briefly, the panoramic photographing operation according to an exemplary embodiment of the present invention can be performed by the procedure as illustrated in FIG. 4. Hereinafter, based on the steps characteristic of the present invention from among the above-mentioned steps, the inventive operation and construction will be described in more detail with reference to the accompanying drawings.

Figure 5:
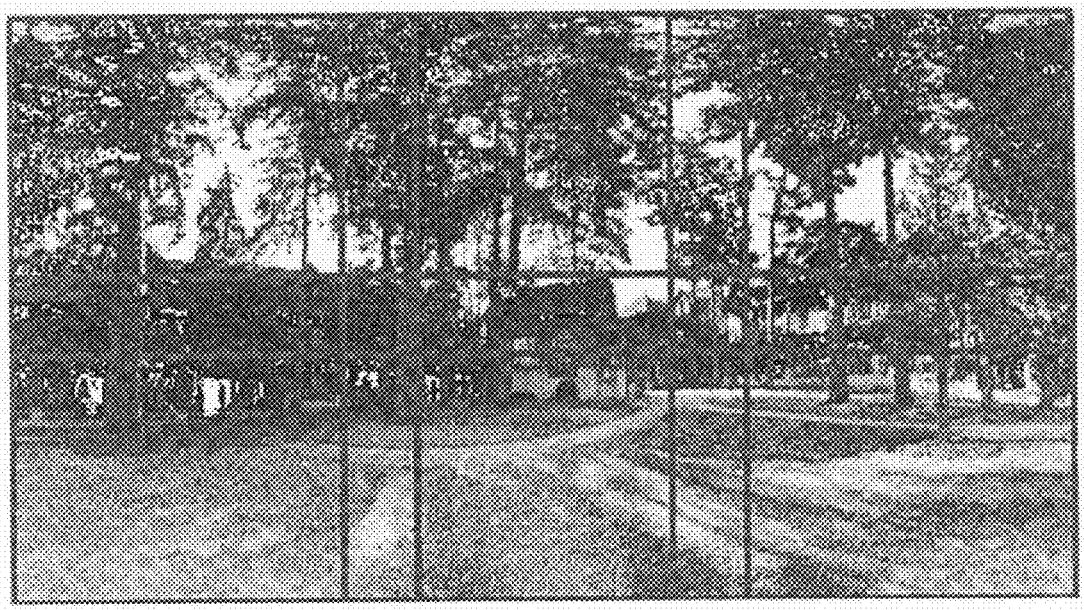
FIG. 5 is a view illustrating a panoramic image photographed according to the present invention.

FIG. 5 illustrates a panoramic image photographed according to the present invention. It can be noted from FIG. 5 that respective scenes constituting the panoramic image are photographed in the 2×3 table format. As shown, in contrast with the conventional scheme in which respective scenes are connected in line in a transverse or longitudinal direction, the present invention makes it possible to compose scenes in a two dimension by selecting a plurality of rows and columns, thus enabling a user to selectively choose the number and spatial configuration of scenes to be photographed.

More specially, in the panoramic photographing mode according to the present invention, there is no limitation on the number of scenes to be photographed. A user can choose the spatial configuration of scenes to be photographed and specify the order of photographing according thereto. The basic principle is applied to the order of photographing according to the spatial configuration of scenes. That is, scenes composed in a table format can be photographed in both transverse and longitudinal directions, but they are photographed in a clockwise/counterclockwise direction, starting from the uppermost left scene. Further, a scene to be photographed next is determined as a scene closest to a previously photographed scene. For example, scenes composed in the 2×2 or 3×3 table format follow the order of photographing as presented in Tables 1 and 2.

TABLE 1

| 1 | 2 |
|---|---|
| 4 | 3 |

TABLE 2

| 1 | 2 | 3 |
|---|---|---|
| 6 | 5 | 4 |
| 7 | 8 | 9 |

Figure 6:
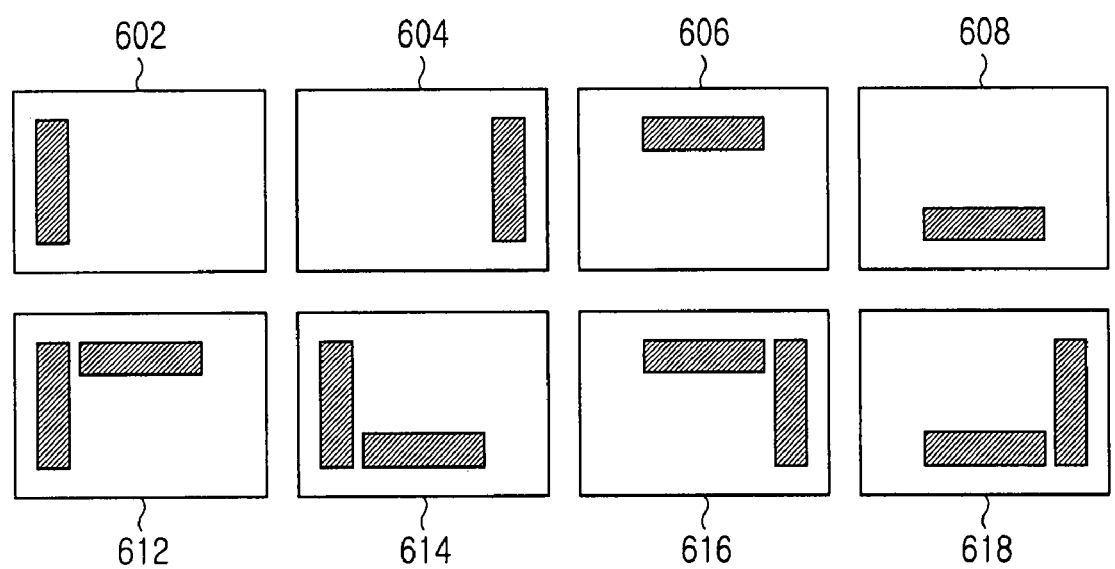
FIG. 6 is a view illustrating how a guide image overlapping with a previous scene in each scene is configured and in which position it is displayed on a preview screen during panoramic photographing according to an exemplary embodiment of the present invention.

FIG. 6 illustrates how a guide image overlapping with a previous scene in each scene is configured and in which position it is displayed on a preview screen during panoramic photographing according to an exemplary embodiment of the present invention.

Referring to FIG. 6, a guide image may be appropriately configured and displayed corresponding to a photographing direction from a previously photographed scene to a scene to be currently photographed, that is, on the upper, lower, left or right side of a preview screen. For example, when a scene is currently photographed in a direction from left to right, a guide image (a portion represented by oblique lines) is appropriately displayed on the left side of a corresponding preview screen 602. Similarly, preview screens corresponding to when a scene is currently photographed in directions from right to left, from top to bottom, and from bottom to top are designated by reference numerals "604", "606" and "698", respectively. If scenes are composed of a plurality of rows and columns, not only the image of a scene photographed just before is displayed as a guide image, but also the image of a scene among previously photographed scenes, which exists in the same row or column and has an overlapping portion with the current scene, may be additionally displayed as a guide image. Preview screens appearing in such a case are designated by reference numerals "612", "614" and "618". For example, the preview screen designated by reference numeral "612" corresponds to the case where a scene in the second row and the second column is photographed. In this case, the guide image extracted from a scene photographed just before (a scene in the second row and the first column) is displayed on the left side of the preview screen, and the guide image extracted from a previously photographed scene (a scene in the first row and the second column) is displayed on the upper side of the preview screen.

Figure 7:
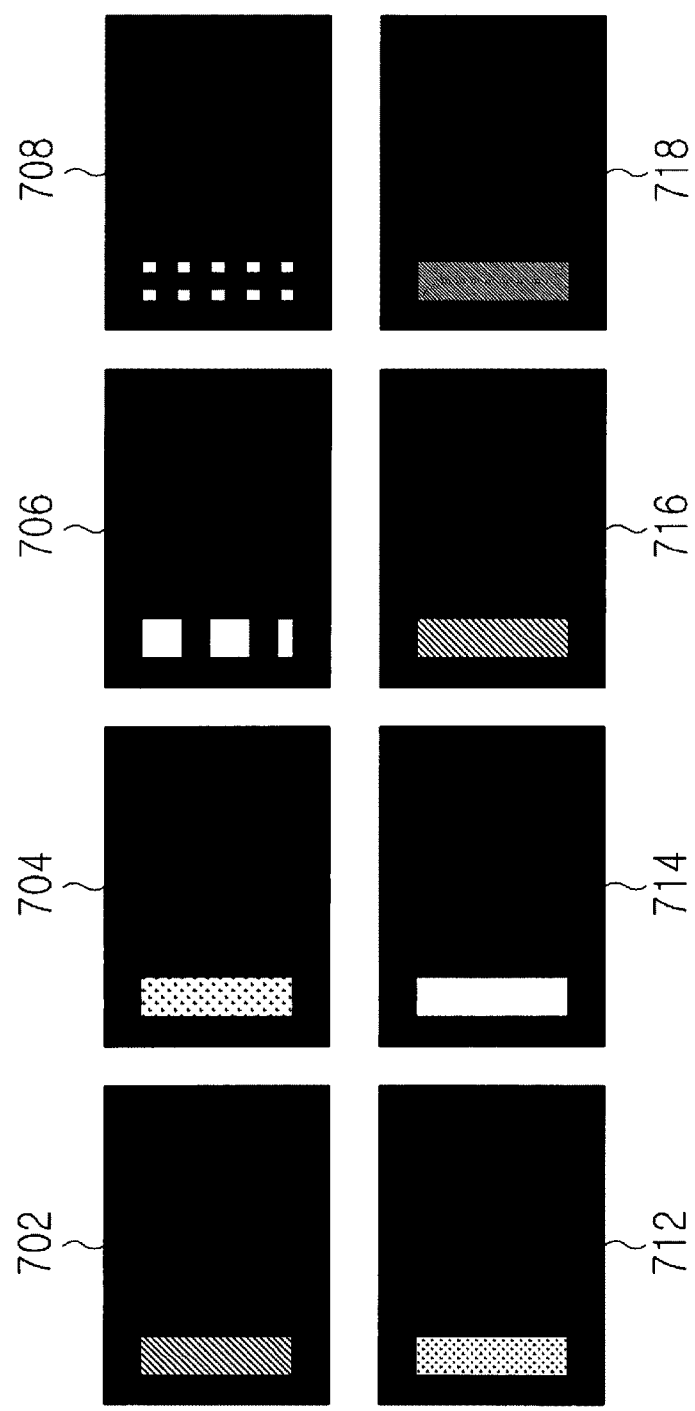
FIG. 7 is a view illustrating a state in which a guide image overlapping with a previous scene in each scene is displayed during panoramic photographing according to an exemplary embodiment of the present invention.

FIG. 7 illustrates a state in which a guide image overlapping with a previous scene in each scene is displayed during panoramic photographing according to an exemplary embodiment of the present invention. In the present invention, when each guide image is displayed on a preview screen, the guide image may be presented by displaying the image of a previously photographed scene in its entirety, as illustrated in FIG. 6, but may also be subjected to proper image processing so as to be discerned from a currently output image on the preview screen.

Referring to FIG. 7, a guide image may be transparently displayed on a preview screen 702 (the guide image can be transparently seen by setting a "diffuse value" to beta). Further, a guide image and a currently output image may be overlappingly displayed pixel by pixel on a preview screen 704. Further, a guide image and a currently output image may be displayed block by block on a preview screen 706 or 708 after the guide image is divided into blocks with proper sizes. In addition, a guide image may be displayed with black and white color on a preview screen 712 or may be highlighted with different tone colors on a preview screen. For example, a guide image may be highlighted with red (R) color of RGB on a preview screen 714, highlighted with green (G) color of RGB on a preview screen 716, or highlighted with blue (B) color of RGB on a preview screen 718.

Figure 9A:
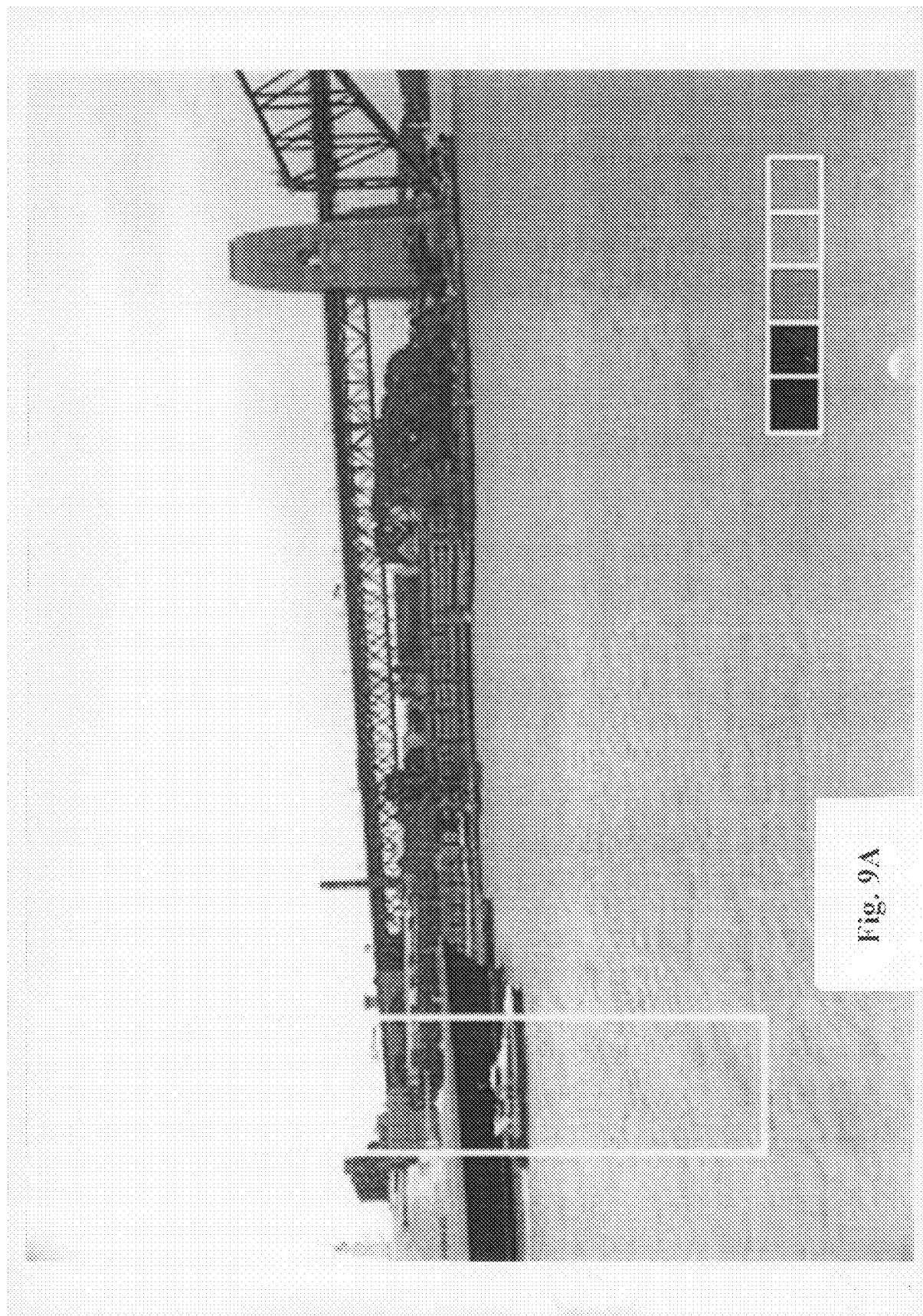
FIGS. 9a, 9b and 9c are views illustrating respective scenes to be photographed during panoramic photographing according to an exemplary embodiment of the present invention.
Figure 9B:
Figure 9C:
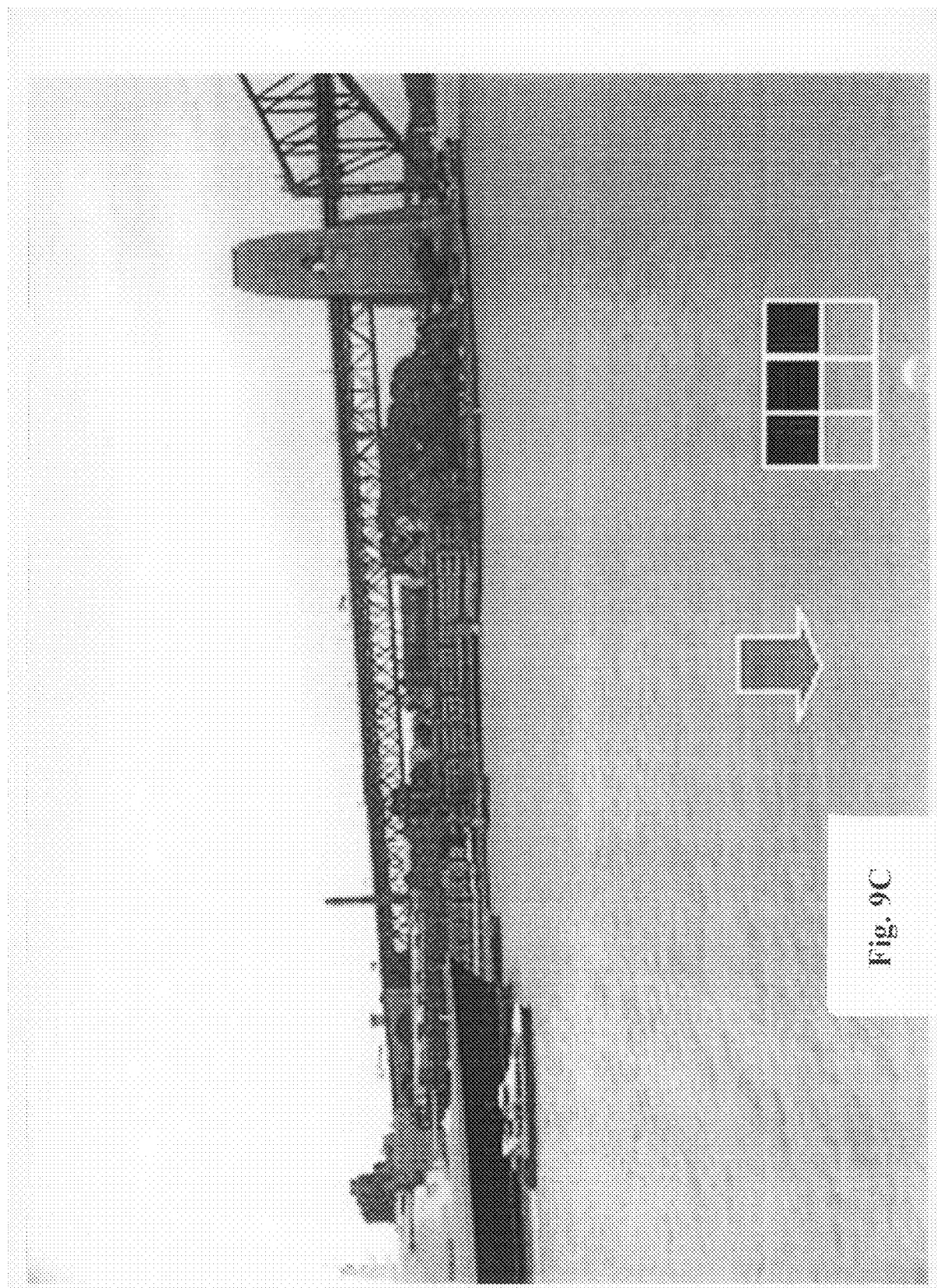

FIGS. 9a, 9b and 9c illustrate respective scenes (preview screens) to be photographed during panoramic photographing operation according to an exemplary embodiment of the present invention. Referring first to FIG. 9a, it can be noted that a guide image 904 is displayed on one side of a preview screen 902 during panoramic photographing. Further, a frame table 906 representing the whole scene frame is displayed as a separate indicator on the bottom of the preview screen 902. Scenes photographed so far, scenes to be subsequently photographed, and a scene to be currently photographed are differently displayed by filling respective cells of the frame table 906 with different substances (color, oblique line, icon, character, flicker, etc.). For example, as illustrated in FIG. 9a, previously photographed scenes may be displayed with black color, a scene to be currently photographed may be displayed with red color, and scenes to be subsequently photographed may be displayed with white (or transparent) color.

If photographing the current scene is completed in such a state, a photographing direction for the next scene may be immediately displayed as a separate indicator. FIG. 9b illustrates a preview screen 912 displayed immediately after a specific scene is photographed. On the right side of the corresponding preview screen 912, a right-hand arrow 918 is displayed as an indicator indicating that a photographing direction for the next scene is a right-hand direction. Further, the frame table 916 of the corresponding preview screen 912 represents that three scenes have been photographed so far.

The present invention may also be constructed in such a manner that a user does not set up a scene frame, but arbitrarily specifies the order of photographing in the course of photographing each scene. With regard to this, a user can specify in which direction the next photographing advances by inputting a corresponding direction key after each scene is photographed. In this case, an appropriate direction-indicating arrow according to the corresponding input direction key, such as the right-hand arrow 918 as illustrated in FIG. 9b, may be displayed.

The preview screen 922 illustrated in FIG. 9c is a preview screen which may appear when a scene frame is previously provided in the 2×3 table format, and three scenes in the first row of the frame table 926 are all photographed. In order to represent that the three scenes in the first row are all photographed, the first row of the frame table 926 is filled with black color, and a downward arrow 928 is displayed.

The preview screen 922 illustrated in FIG. 9c may be a screen appearing when a user arbitrarily sets the order of photographing. That is, if a user photographs three scenes in a transverse direction and then inputs the downward direction key, a scene frame is determined to include at least the 2×3 table format. Thus, the frame table 926 having the 2×3 table format as illustrated in FIG. 9c is displayed, and the downward arrow 928 may be further displayed. Of course, although a user arbitrarily sets the photographing direction of each scene in FIG. 9c, it is possible to indicate the next scene to be photographed according to the determined scene frame.

The panoramic photographing operation according to an exemplary embodiment of the present invention can be performed as described above, but various modifications may be made therein without departing from the scope of the present invention. For example, in the description about FIG. 4, a user sets up a frame for scenes constituting a panoramic image at the beginning of panoramic photographing. However, in another embodiment of the present invention, a corresponding frame may be set up in a separate menu setting mode. That is, steps 402, 424 and 426 illustrated in FIG. 4 are performed in a separate menu setting mode, information set in the separate menu setting mode is checked at the beginning of panoramic photographing, and then steps 430 to 438 or steps 404 to 414 are performed according to the checked information.

In the above description, a scene frame is selected by displaying a menu screen for frame setup in an i×j table format and inputting navigation keys. However, it is possible for a user to directly input values corresponding to i and j of an i×j table format through numeral keys.

Further, in the description about FIG. 4, a scene frame is set up in advance or arbitrarily set up whenever each scene is photographed, but it is possible to set up a scene frame in combination thereof. For example, even when a scene frame having the 1×5 table format is set up in advance, a user can arbitrarily set a photographing direction from now on by inputting a proper direction key. That is, when a user inputs the downward direction key in the state illustrated in FIG. 9b, a scene frame can be newly set up as illustrated in FIG. 9c.

As described above, a panoramic photographing scheme according to the present invention enables a user to more easily handle a photographing operation and be provided with more autonomy in the structure of each scene constituting a panoramic image.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of photographing a panoramic image, the method comprising:
   a first step of checking whether a configuration of each scene constituting the panoramic image is set according to a predetermined frame or arbitrarily set whenever each scene is photographed;
   a second step of outputting a photographic guide screen on a preview screen when the configuration of each scene is set, the photographic guide screen overlappingly displaying a guide image of a previously photographed scene and an indicator indicative of a position of a currently photographed scene in a whole frame;
   a third step of storing a corresponding photographed scene according to a corresponding numbered scene when a shutter key is input during the second step; and
   a fourth step of checking if a predetermined direction key or a completion key is input after the third step, determining that all scenes are completely photographed when the completion key is input, and considering the frame to extend from the currently photographed scene along an up-and-down direction or a right-and-left direction corresponding to the input direction key and proceeding to the second step of outputting the photographic guide screen when the direction key is input;
   wherein the indicator indicative of a position of a currently photographed scene in the whole frame is composed in a table format, and scenes photographed so far, scenes to be subsequently photographed, and a scene to be currently photographed are differently displayed by filling respective cells of the table with different substances.

2. The method as claimed in claim 1, wherein, when all the scenes are determined to be completely photographed, the photographed scenes are connected into a single panoramic image, and the panoramic image is stored.

3. The method as claimed in claim 2, wherein the stored panoramic image is transmitted to an external device.

4. The method as claimed in claim 1, wherein, in the fourth step, a direction toward a scene to be photographed next is further displayed when the fourth step proceed to the second step.

5. The method as claimed in claim 1, wherein the configuration of each scene constituting the panoramic image is set according to the predetermined frame by performing the steps of:
 displaying an initial frame provided in a format of an i×j table;
 checking if the direction keys are input in a state where the initial frame is displayed, filling corresponding cells of the i×j table with a predetermined substance according to inputs of the corresponding direction keys when the direction keys are input, and displaying the cells filled with the predetermined substance; and
 checking if a predetermined SET key is input, and storing a frame having rows and columns according to the filled cells of the i×j table when the SET key is input.

6. A method of photographing a panoramic image, the method comprising:
 a first step of outputting a photographic guide screen on a preview screen, the photographic guide screen overlappingly displaying a guide image of a previously photographed scene and an indicator indicative of a position of a currently photographed scene in a whole frame;
 a second step of storing a corresponding photographed scene according to a corresponding numbered scene when a shutter key is input during the first step; and
 a third step of checking if a predetermined direction key or a completion key is input after the second step is conducted, determining that all scenes are completely photographed when the completion key is input, and considering the frame to extend from the currently photographed scene along an up-and-down direction or a right-and-left direction corresponding to the input direction key and proceeding to the first step of outputting the photographic guide screen when the direction key is input;
 wherein the indicator indicative of a position of a currently photographed scene in the whole frame is composed in a table format, and scenes photographed so far, scenes to be subsequently photographed, and a scene to be currently photographed are differently displayed by filling respective cells of the table with different substances.

7. The method as claimed in claim 6, wherein, when the third step proceeds to the first step, a direction toward a scene to be photographed next is further displayed.

8. The method as claimed in claim 6, wherein the scenes photographed form a plurality of rows and columns, not only the guide image of the previously photographed scene is displayed, but also an image of a scene among the corresponding scenes, which exists in a same row or column and has an overlapping portion with a current scene, is additionally displayed as the guide image.

9. The method as claimed in claim 6, wherein the guide image is displayed overlappingly with a current scene in a transparent manner, pixel by pixel, or block by block.

10. The method as claimed in claim 6, wherein the guide image is displayed with black and white color or highlighted with predetermined color.

11. A method of photographing a panoramic image, the method comprising:
 a first step of setting a configuration of each scene constituting the panoramic image according to a predetermined frame;
 a second step of outputting a photographic guide screen on a preview screen, the photographic guide screen overlappingly displaying a guide image of a previously photographed scene and an indicator indicative of a currently photographed scene in the predetermined frame;
 a third step of storing a corresponding photographed scene according to a corresponding numbered scene when the shutter key is input during the second step; and
 a fourth step of checking if the currently photographed scene is a last scene in the predetermined frame after the third step, determining that all scenes are completely photographed when the currently photographed scene is the last scene, and proceeding to the second step of outputting the photographic guide screen when all the scenes are not completely photographed,
 the first step comprising the steps of:
 displaying an initial frame provided in a format of an i×j table;
 checking if direction keys are input in a state where the initial frame is displayed, filling corresponding cells of the i×j table with a predetermined substance according to inputs of the corresponding direction keys when the direction keys are input, and displaying the cells filled with the predetermined substance; and
 checking if a predetermined SET key is input, and storing a frame having rows and columns according to the filled cells of the i×j table when the SET key is input;
 wherein the indicator indicative of a position of a currently photographed scene in the whole frame is composed in a table format, and scenes photographed so far, scenes to be subsequently photographed, and a scene to be currently photographed are differently displayed by filling respective cells of the table with different substances.

12. The method as claimed in claim 11, wherein a direction toward a scene to be photographed next is further displayed when the third step proceeds to the first step, and the scene to be photographed next is determined as a scene closest to a current scene in a clockwise or counterclockwise direction.

13. The method as claimed in claim 12, wherein, when the scenes photographed form a plurality of rows and columns, not only the guide image of the previously photographed scene is displayed, but also an image of a scene among the corresponding scenes, which exists in a same row or column and has an overlapping portion with a current scene, is additionally displayed as the guide image.

14. The method as claimed in claim 12, wherein the guide image is displayed overlappingly with a current scene in a transparent manner, pixel by pixel, or block by block.

15. The method as claimed in claim 12, wherein the guide image is displayed with black and white color or highlighted with predetermined color.

* * * * *